(12) United States Patent
Munekata et al.

(10) Patent No.: US 6,665,236 B1
(45) Date of Patent: Dec. 16, 2003

(54) MAGNETO-OPTICAL STORAGE MEDIUM HAVING A RECORDING LAYER OF PHOTOINDUCED-MAGNETIC MATERIAL

(75) Inventors: Hiroo Munekata, Yokosuka (JP); Shinya Koshihara, Kawasaki (JP)

(73) Assignee: Japan Science and Technology Corporation (JP)

( * ) Notice: Subject to any disclaimer, the term of this patent is extended or adjusted under 35 U.S.C. 154(b) by 0 days.

(21) Appl. No.: 09/889,400

(22) PCT Filed: Feb. 9, 1999

(86) PCT No.: PCT/JP99/00547

§ 371 (c)(1),
(2), (4) Date: Jul. 17, 2001

(87) PCT Pub. No.: WO00/48180

PCT Pub. Date: Aug. 17, 2000

(51) Int. Cl.⁷ .............................................. G11B 11/00
(52) U.S. Cl. .................................. 369/13.38; 428/64.3
(58) Field of Search .................. 369/13.38, 13.41, 369/13.35, 13.49; 428/64.3, 694 ML, 694 MM, 64.1; 365/122

(56) References Cited

U.S. PATENT DOCUMENTS 4,871,614 A * 10/1989 Kobayashi .................. 428/336
5,723,978 A * 3/1998 Inomata et al. ............. 324/235

FOREIGN PATENT DOCUMENTS

JP          3-203052 A  *  9/1991    .............. 369/13.38

* cited by examiner

Primary Examiner—Tan Dinh
(74) Attorney, Agent, or Firm—Lorusso, Loud & Kelly

(57) ABSTRACT

There is provided a magneto-optical recording medium and a magneto-optical recording device which greatly reduce the amount of time and light (electric) energy required for writing and reading of data while maintaining high-density recording and which can reduce the size and energy consumption of the magneto-optical recording device.

The magneto-optical recording medium contains a recording layer (23) formed of a photoinduced-magnetic material thin film, and a memory layer (24) formed of a ferromagnetic thin film having perpendicular magnetic anisotropy, wherein the recording layer is subjected to photoinduced magnetization in which magnetism is produced directly through irradiation with light.

19 Claims, 5 Drawing Sheets

MAGNETO-OPTICAL STORAGE MEDIUM HAVING A RECORDING LAYER OF PHOTOINDUCED-MAGNETIC MATERIAL

CROSS-REFERENCE TO RELATED APPLICATIONS

This application is a National Phase Application (35 USC 371) of PCT/JP99/00547 filed Feb. 9, 1999.

TECHNICAL FIELD

The present invention relates to a magneto-optical recording medium and a magneto-optical recording device.

BACKGROUND ART

Conventional techniques in relation to magneto-optical recording media will be described below.

(1) FIG. 1 shows a cross-sectional view of a conventional magneto-optical disk medium, and FIG. 2 illustrates the principle of operation, by reference to a temperature process.

In FIG. 1, reference numeral 1 represents a substrate, 2 a nitride film, 3 a memory layer (TbFeCo), 4 a recording layer (TbDyFeCo), 5 a nitride film, 6 an adhesive layer, 7 a magnet for producing an initialization magnetic field (Hint), and 8 a magnet for producing a bias magnetic field (Hb).

The magneto-optical disk medium shown in these drawings is of overwriting type, in which data are recorded or erased in accordance with the intensity of light. A magnetic layer contains the recording layer 4 and the memory layer 3, which are magnetically coupled with each other. In the magneto-optical disk medium, the recording layer 4 has a high Curie temperature (Tc) [i.e., 280° C. (see the upper dotted line of FIG. 2)], and the memory layer 3 has a low Curie temperature (Tc) [i.e., 170° C. (see the lower dotted line of FIG. 2)].

When data are to be recorded, a light beam of high intensity is applied to the medium such that the temperatures of the memory layer 3 and the recording layer 4 exceed the Curie temperature of the recording layer 4, whereby the magnetization directions of these layers are reversed to the direction of a bias magnetic field (Hb) (about 200 Oe) (the downward direction in FIGS. 1 and 2).

When data are to be erased, firstly, the magnetization direction of only the recording layer 4 is uniformly reversed to the upward direction in FIGS. 1 and 2 by means of an initialization magnetic field (Hint) (7 kOe). This reverse occurs since the coercive force (Ec) of the recording layer 4 at room temperature is low (i.e., 1 to 2 kOe). Subsequently, a portion of the memory layer 3 at which data are to be erased is irradiated with a light beam of medium intensity, such that the temperature of the memory layer 3 exceeds the Curie temperature Tc of the memory layer. The magnetism of the memory layer 3 temporarily disappears. However, during a cooling process, the memory layer 3 magnetically couples with the recording layer, by means of an exchange coupling force, so that the direction of magnetization of the memory layer 3 becomes upward. In other words, data in the memory layer 3 are erased through magnetic transfer by means of an exchange coupling magnetic field (Hexc).

There has been developed a magneto-optical disk medium including an intermediate layer provided between a recording layer and a memory layer in order to reduce effective exchange coupling force. The internal layer is formed of a magnetic material, such as GdFeCo, which has low perpendicular magnetic anisotropy and enables smooth connection of rotation of micro magnetic domains. Consequently, Hint is reduced to 2.5 kOe, and furthermore, the overall thickness of the magnetic layer can be reduced from 200 nm to 120 nm.

(2) Subsequent progress in development of a magneto-optical disk medium has been in the form of development of a magneto-optical disk medium requiring no initialization magnet.

FIG. 3 shows a cross-sectional view of the conventional magneto-optical disk medium, which contains four layers.

In FIG. 3, reference numeral 11 represents a substrate, 12 a nitride film, 13 a memory layer, 14 a recording layer, 15 a switching layer, 16 an initial magnetization layer, 17 a nitride film, 18 an adhesive layer, and 19 a magnet for producing a bias magnetic field.

The magneto-optical disk medium employs a structure such that an initialization magnet is incorporated into the medium in the form of a magnetic layer. An initialization magnetic layer which has a Curie temperature of 300° C. and which is always magnetized in a consistent magnetization direction is provided as the uppermost layer. In order to transmit the effect of initialization to a lower layer in accordance with the intensity of light, the switching layer 15, which has a low Curie temperature (about 150° C.), is provided below the initial magnetization layer 16. The disk medium can be operated by use of only the bias magnet 19, since the medium does not require an initialization magnet.

In the magneto-optical disk media described in the above background art techniques (1) and (2), the recording layer 4 and 14 are formed of a metallic magnetic thin film. Each of the disk media employs a Curie point data writing system. The recording layer 4 or 14 of the medium is irradiated with a focused laser beam such that a portion of the layer at which data are to be recorded is heated locally to 280° C. (i.e., higher than the Curie temperature of the layer), and a bias magnetic field is applied to thereby promote magnetization reverse. Simultaneously, through exchange coupling, data are transferred to the memory layer. Erasing of data is carried out through combination of irradiation of light and application of an initialization magnetic field [by use of a permanent magnet in the case of the background art technique (1), or by use of an initial magnetization layer in the case of the conventional technique (2)].

An object of the present invention is to provide a magneto-optical recording medium and a magneto-optical recording device which greatly reduce the amount of time and light (electric) energy required for writing and reading of data while maintaining high-density recording and which can reduce the size and energy consumption of the magneto-optical recording device.

DISCLOSURE OF THE INVENTION

To achieve the above object, the present invention provides the following:

[1] A magneto-optical recording medium comprising a recording layer formed of a photoinduced-magnetic material thin film, and a memory layer formed of a ferromagnetic thin film having perpendicular magnetic anisotropy, wherein the recording layer is subjected to photoinduced magnetization in which magnetism is produced directly through irradiation with light under application of a bias magnetic field.

[2] The magneto-optical recording medium described in [1] above, wherein the photoinduced-magnetic material thin film is a magnetic semiconductor (monocrystalline, polycrystalline, or amorphous) thin film.

[3] The magneto-optical recording medium described in [1] above, wherein the photoinduced-magnetic material thin film is a diluted magnetic semiconductor (monocrystalline, polycrystalline, or amorphous) thin film.

[4] The magneto-optical recording medium described in [1] above, wherein the photoinduced-magnetic material thin film is a Group III–V diluted magnetic semiconductor (monocrystalline, polycrystalline, or amorphous) thin film.

[5] The magneto-optical recording medium described in [1] above, wherein the photoinduced-magnetic material thin film is an organometallic complex (monocrystalline, polycrystalline, or amorphous) thin film.

[6] The magneto-optical recording medium described in [1] above, wherein the photoinduced-magnetic material thin film is a multi-layer structure film containing at least one magnetic semiconductor thin film.

[7] The magneto-optical recording medium described in [1] above, wherein the photoinduced-magnetic material thin film is a multi-layer structure film containing at least one diluted magnetic semiconductor thin film.

[8] The magneto-optical recording medium described in [1] above, wherein the photoinduced-magnetic material thin film is a multi-layer structure film containing at least one Group III–V diluted magnetic semiconductor thin film.

[9] The magneto-optical recording medium described in [1] above, wherein the photoinduced-magnetic material thin film is a multi-layer structure film containing at least one organometallic complex thin film.

[10] The magneto-optical recording medium described in [1] above, wherein the memory layer is a thin film of an alloy or compound containing a transition metal.

[11] The magneto-optical recording medium described in [1] above, wherein the memory layer is a thin film of an alloy or compound containing a rare earth metal.

[12] The magneto-optical recording medium described in [1] above, wherein the memory layer is formed from an Fe—Co-based magnetic thin film material.

[13] The magneto-optical recording medium described in [1] above, wherein the memory layer is formed from a Tb—Fe—Co-based magnetic thin film material.

[14] A magneto-optical recording device comprising a magneto-optical recording medium which is fixed mounted, which medium comprises a recording layer formed of a photoinduced-magnetic material thin film and a memory layer formed of a ferromagnetic thin film having perpendicular magnetic anisotropy, wherein the recording layer is subjected to photoinduced magnetization in which magnetism is produced directly through irradiation with light.

[15] The magneto-optical recording device described in [14] above, wherein the light irradiation is carried out by means of a low-output semiconductor laser.

[16] The magneto-optical recording device described in [15] above, which further comprises a bias magnetization device.

[17] A magneto-optical recording device comprising a magneto-optical recording medium which assumes a transportable form, which medium comprises a recording layer formed of a photoinduced-magnetic material thin film and a memory layer formed of a ferromagnetic thin film having perpendicular magnetic anisotropy.

[18] The magneto-optical recording device described in [17] above, wherein the light irradiation is carried out by means of a low-output semiconductor laser.

[19] The magneto-optical recording device described in [18] above, which further comprises a bias magnetization device.

BEST MODE FOR CARRYING OUT THE INVENTION

An embodiment of the present invention will next be described in detail with reference to the drawings.

Figure 1:
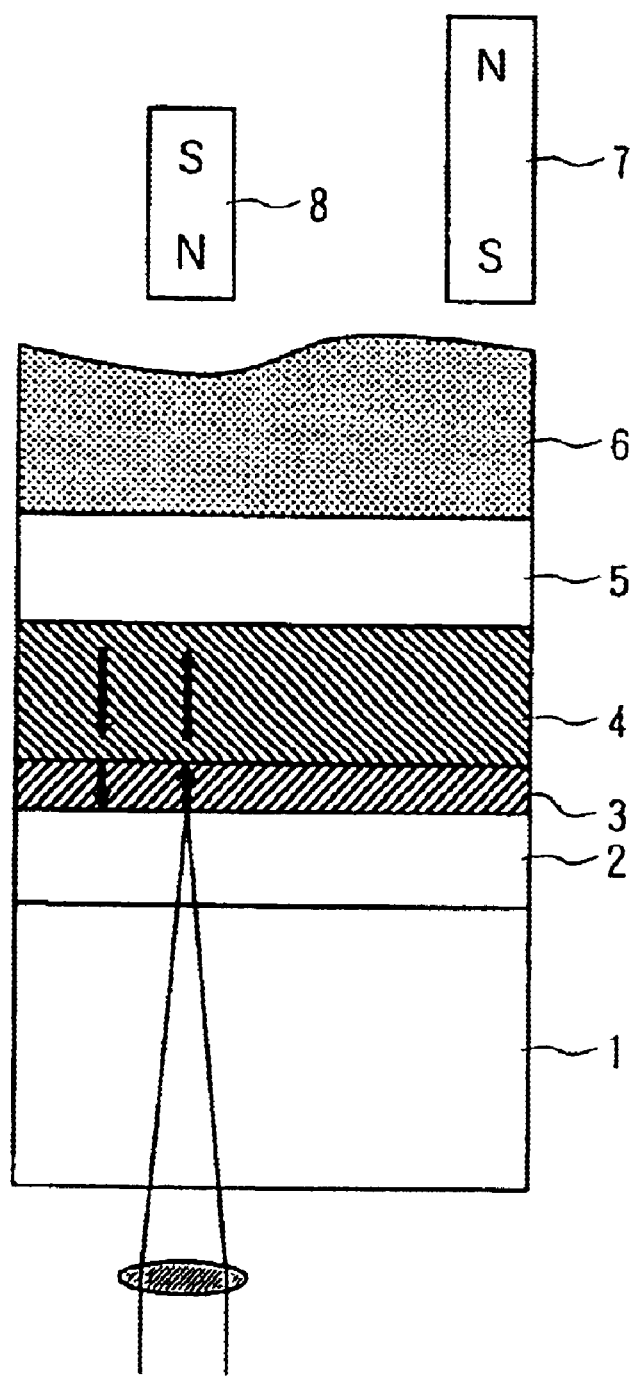
FIG. 1 shows a cross-sectional view of a conventional magneto-optical disk medium.
Figure 2:
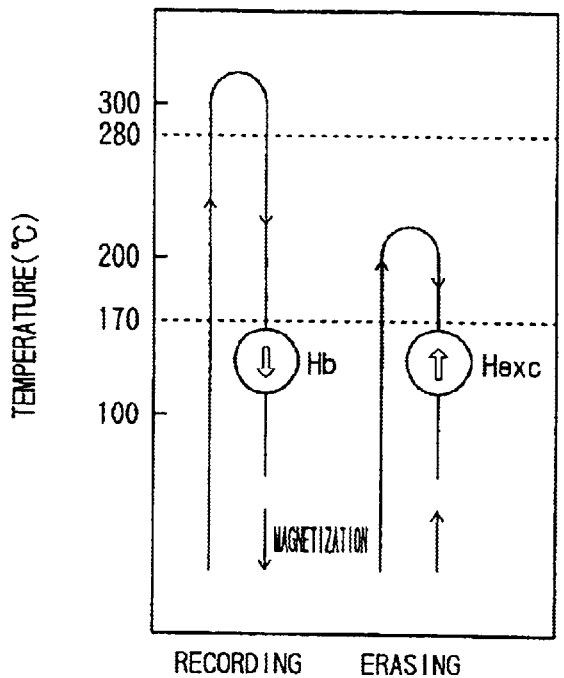
FIG. 2 illustrates the principle of operation of a conventional magneto-optical disk medium with reference to a temperature process.
Figure 3:
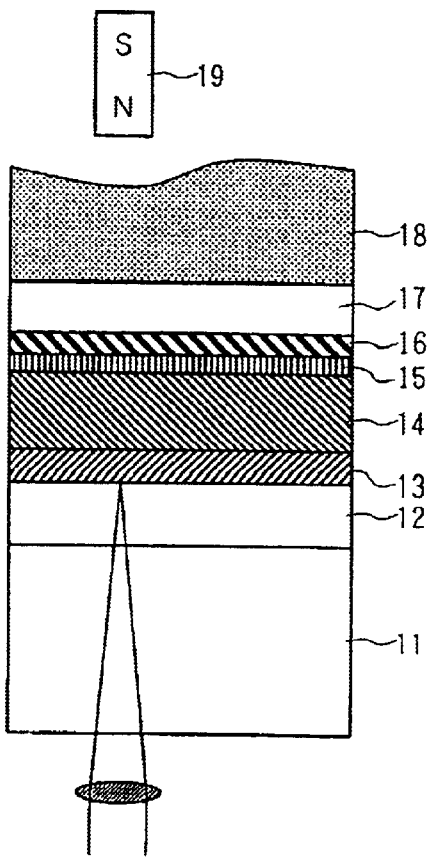
FIG. 3 shows a cross-sectional view of a conventional magneto-optical disk medium containing four layers.
Figure 4:
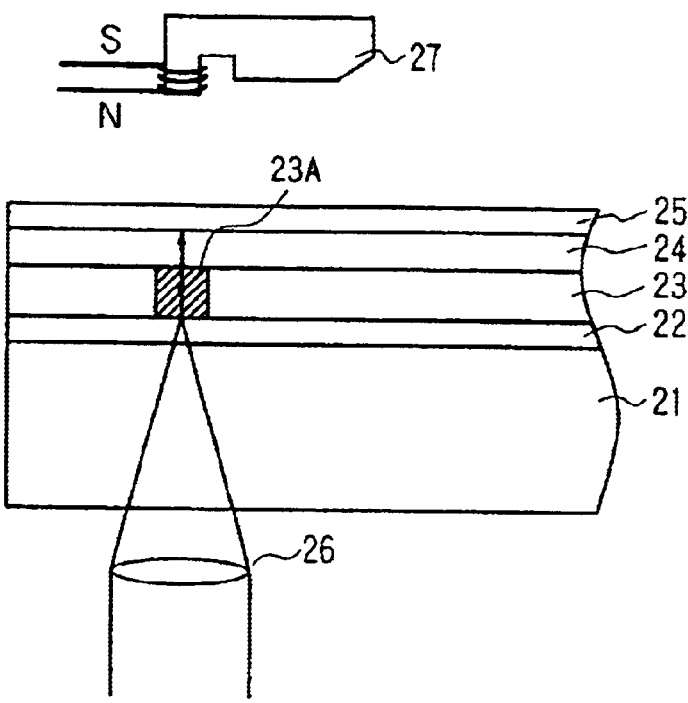
FIG. 4 shows a cross-sectional view of an essential portion of the magneto-optical recording medium according to the embodiment of the present invention.

FIG. 4 shows a cross-sectional view of an essential portion of the magneto-optical recording medium according to the embodiment of the present invention.

In FIG. 4, reference numeral 21 represents a transparent substrate, 22 a transparent buffer layer, 23 a recording layer, 23A a photoinduced magnetization portion, 24 a memory layer (writing layer), 25 a protective film, 26 an optical system, and 27 a bias magnetization device.

As described above, the magneto-optical recording medium has a thin-film structure including at least two layers having different functions. The recording layer 23 has a writing function for temporarily producing magnetism during irradiation with a light beam. The memory layer 24 has a function for transferring magnetism produced in the recording layer 23 through magnetic coupling and for maintaining magnetic data after completion of irradiation with a light beam.

Since a light beam for data writing reaches the recording layer 23 first, the following two effects are attained, and writing power time can be reduced.

(1) Since light absorption in the memory layer 24 can be prevented, a larger number of carriers are generated in the recording layer 23 upon irradiation of light having the same power as that employed in conventional media.

(2) Most of the light beam (i.e., at least 70% of the light beam) is absorbed in the recording layer 23, and thus the amount of the light beam absorbed in the memory layer 24 decreases. Therefore, generation of heat, which causes writing errors in the memory layer 24, can be suppressed.

Figure 5:
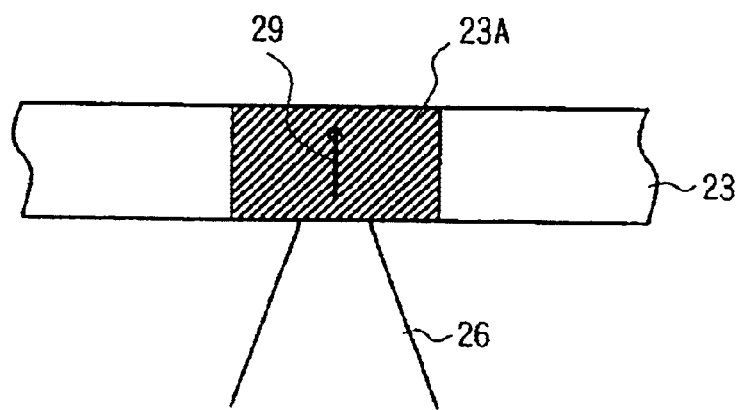
FIG. 5 is an explanatory view showing light power required for recording (writing) of data into the magneto-optical recording medium of the present invention.

As shown in FIG. 5, when the light beam for data writing reaches the recording layer 23, a photoinduced magnetization portion 23A is generated in the layer 23, such that the direction of magnetization 29 of the portion 23A becomes upward.

The protective film 25 prevents oxidation and wear of the memory layer 24. The transparent buffer layer 22 enhances quality of the recording layer 23 (uniformity of composition and grain boundaries).

Examples of the material of the recording layer 23 include:

(1) (a) monocrystalline Group III–V diluted magnetic semiconductor InMnAs film,
    (b) two-layer film containing InMnAs thin film and GaAlSb thin film, and
    (c) GaMnAs film;
(2) polycrystalline InMnAs film; and
(3) organometallic complex polycrystalline film.

When such a material is irradiated with a light beam of appropriate wavelength, a large number of carriers are generated in the material, and the carriers interact with magnetic atoms of a matrix. As a result, "photoinduced magnetization" occurs.

Specifically, the recording layer 23 is formed from a non-metallic material which assumes magnetism induced by light (hereinafter referred to as "photoinduced-magnetic material") (e.g., a magnetic semiconductor or an organometallic complex), and the electron spin density of electrons, holes, or electron-hole pairs generated in the material is increased or decreased through irradiation with the light beam, to thereby control the magnetic phase of the material from paramagnetism to ferromagnetism. Therefore, in principle, a process for converting the light beam into heat is not necessary. Briefly, the power of a laser beam required for data writing can be reduced to, for example, about 0.4 mW.

However, similar to the case of the aforementioned conventional technique, a bias magnetic field is applied when light irradiation is carried out during writing of data, and data are magnetically transferred to the memory layer 24 by means of exchange coupling.

The recording layer 23 may be formed from an organic material such as a cyano-cobalt-complex. Examples of the material of the memory layer 24 include ferromagnetic materials having perpendicular magnetic anisotropy, such as Tb—Fe—Co thin film.

The magneto-optical recording medium employs the principle of "photoinduced magnetization" in which magnetism is produced directly through irradiation with light. Therefore, the amount of light energy required for writing of data can be greatly reduced, and the time required for writing of data can be considerably shortened, as compared with a conventional magneto-optical recording medium employing a Curie point data writing system, in which writing of data is carried out through conversion of light energy into heat energy.

FIG. 5 is an explanatory view showing light power required for recording (writing) of data into the magneto-optical recording medium of the present invention.

As shown in FIG. 5, the photoinduced magnetization portion 23A of the recording layer 23 is irradiated with a light beam 26. The photoinduced magnetization portion 23A has a diameter of 1 µm and a depth of 0.1 µm. The wavelength of the light beam is 0.8 µm ($2.5 \times 10^{-19}$ J per photon).

Photoinduced magnetization requires a carrier density of $2 \times 10^{19}$ cm$^{-3}$, light carrier production efficiency of 1, and a lifetime ($\tau$) of $10^{-10}$ seconds.

The number of necessary photons [photon/second] (G) is calculated as follows.

$$2 \times 10^{19} \times (0.5 \times 10^{-4})^2 \pi (0.1 \times 10^{-4}) = G\tau$$

$$G = (2 \times 10^{19} \times 7.9 \times 10^{-15}) \times \tau^{-1} = 1.57 \times 10^{15} \text{ [photon/second]}$$

light power $(P) = G \times (2.5 \times 10^{-19}) = 1.57 \times 10^{15} \times 2.5 \times 10^{-19} = 3.925 \times 10^{-4}$ [J/sec]=0.39 mW As described above, the amount of light energy required for writing of data can be greatly reduced, and the time required for writing of data can be considerably shortened.

Reading of recorded magnetic data is carried out by irradiating the medium with light, and detecting the intensity and polarization angle of light reflected from the memory layer 24 and the recording layer 23 by means of the Kerr effect. The reading system of the magneto-optical recording medium is similar to that for a conventional magnetic disk, and thus the medium is compatible with a conventional optical system.

As described above, the light intensity required for reading of data is lower than that for writing of data.

Erasing of data is carried out by reversing the magnetization direction of the memory layer to the initial direction. In order to reverse the magnetization direction, the direction of a current applied to the bias magnetization device (electromagnet) 27 is reversed, and a reverse magnetic field is applied to the medium. Therefore, there is no need for an initialization magnetization device or an initialization magnetization layer. Further, irradiation with light for initialization is not necessary.

The present invention also provides a magneto-optical recording device which is fixed mounted and includes a magneto-optical recording medium comprising a recording layer formed of a photoinduced-magnetic material thin film and a memory layer formed of a ferromagnetic thin film having perpendicular magnetic anisotropy, wherein the recording layer undergoes photoinduced magnetization in which magnetism is produced directly through irradiation with light.

The light irradiation may be carried out by means of a low-output semiconductor laser of 1 mW or less.

The magneto-optical recording device further comprises a bias magnetization device. The present invention also provides a magneto-optical recording device which assumes a transportable form and includes a magneto-optical recording medium comprising a recording layer formed of a photoinduced-magnetic material thin film and a memory layer formed of a ferromagnetic thin film having perpendicular magnetic anisotropy.

The light irradiation may be carried out by means of a low-output semiconductor laser of 1 mW or less.

The magneto-optical recording device further comprises a bias magnetization device 27.

As described above, the present invention has the following advantages:

(1) writing operation can be performed without utilization of heat generation;
(2) the system can be fabricated by use of a laser light source having a power of 1 mW or less; and
(3) initialization of the memory layer does not require a dedicated device or an additional layer.

Examples of the present invention will next be described.

Figure 6:
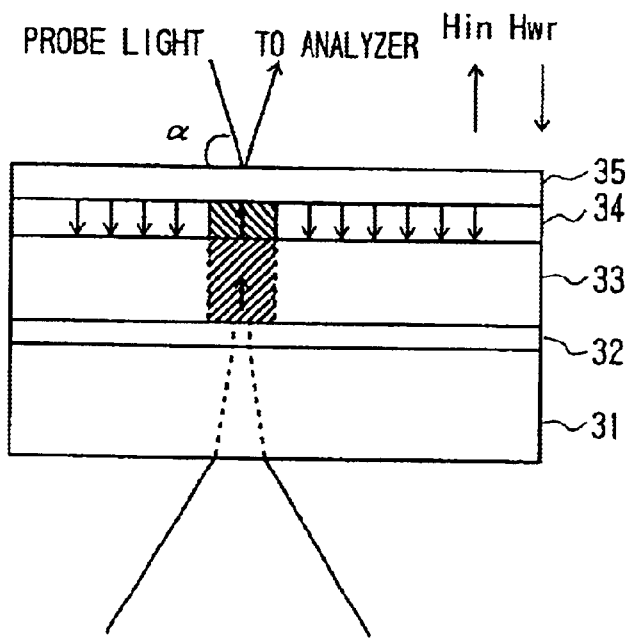
FIG. 6 shows a cross-sectional view of the magneto-optical recording medium of Example 1-a of the present invention.

FIG. 6 shows a cross-sectional view of the magneto-optical recording medium of Example 1-a of the present invention.

In Example 1-a, the medium includes a GaAs <100> substrate 31 (thickness: 200–400 µm), an InAs buffer layer 32 (thickness: 10 nm), an InMnAs recording layer 33 (thickness: 100 nm), a Tb—Fe—Co memory layer 34 (thickness: 30 nm), and an $Si_3N_4$ protective layer 35 (thickness: 30 nm). In Example 1-a, a light beam (wavelength: 0.9 μm) is used for writing operation.

The magneto-optical recording medium is produced as follows. Firstly, by use of a molecular beam epitaxy (MBE) apparatus, the monocrystalline $In_{1-x}Mn_xAs$ thin film recording layer 33 (x=0.1, thickness: 0.1 μm) is formed on the InAs buffer layer 32 (diameter: 2 inches, thickness: 10 nm)/the GaAs <100> substrate 31, at a substrate temperature of 190° C. Single elements In, Mn, and As, serving as starting materials, are sublimated at k-cell temperatures of 900° C., 910° C., and 230° C., respectively. Initiation and completion of film formation is controlled by opening-closing operation of a front shutter of the k-cell. The resultant sample is removed from the MBE apparatus, and subjected to hole measurement at room temperature, to thereby verify that the density of holes (carriers) in the film is $5\times10^{18}$ cm$^{-3}$ and the film is paramagnetic.

Subsequently, the sample is introduced into a sputtering apparatus, the amorphous Tb—Fe—Co memory layer 34 (thickness: 30 nm) is formed on the surface of the InMnAs recording layer 33, and then the $Si_3N_4$ protective layer 35 (thickness: 30 nm) is formed on the memory layer. Thereafter, the sample is removed from the sputtering apparatus, to thereby complete production of the recording medium.

The magneto-optical recording medium was tested through the following steps. (1) Firstly, an initialization magnetic field (Hin) is applied to the sample by use of an electromagnet, and the Tb—Fe—Co memory layer 34 is magnetized such that the magnetization direction of the layer is uniformly directed downward.

(2) Subsequently, a bias magnetic field (Hwr) is applied to the sample, a laser beam having a wavelength of 0.9 μm and a power (P) is focused so as to attain a beam diameter of 2 μm, and then the bottom surface of the GaAs substrate 31 is irradiated with the laser beam (i.e., writing of data is performed).

The medium was tested under the following conditions:

Hin=−500 to −1,000 Oe;

Hwr=+100 to +400 Oe; and

P=0.1 mW to 10 mW.

(3) Simultaneously, the surface of the Tb—Fe—Co memory layer 34 is irradiated with a linearly polarized probe light beam (wavelength: 0.9 μm), and the Kerr rotation angle of the reflected light (the angle of rotation of the linear polarization plane of the reflected light with respect to the incident linear polarization plane) is measured by use of an analyzer, to thereby detect the presence of magneto-optical recording.

Figure 7:
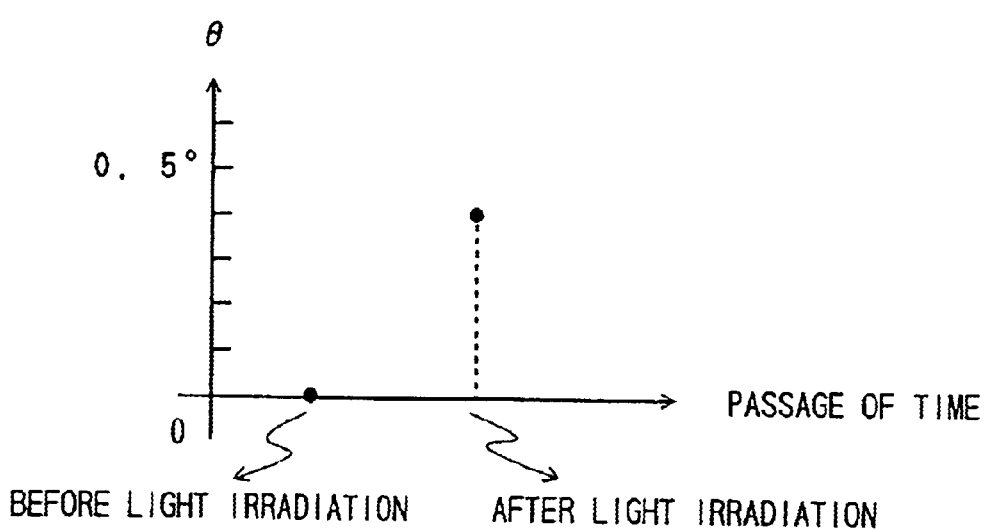
FIG. 7 is a graph showing a writing operation in Example 1-a of the present invention.
Figure 8:
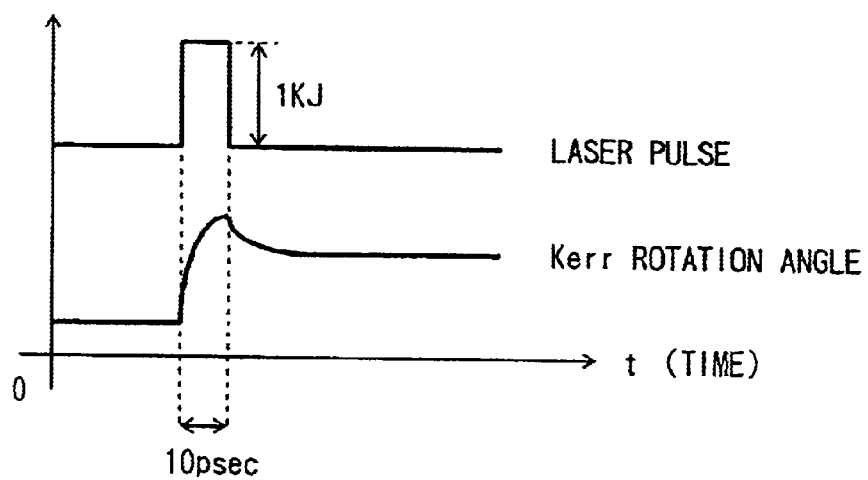
FIG. 8 is a graph showing a writing time measured in Example 1-a of the present invention.

(4) When the rotation angle (θ) before irradiation of the light beam for writing of data is regarded as 0.4°, θ was 0.1° or less when P was about 1 mW, and θ increased to about 0.4° when P was increased to about 3 mW. Even after the bias magnetic field Hwr was removed, θ was maintained at 0.4°. This indicates that writing of data was effected. FIG. 7 shows the relation between the irradiation of the light beam and the rotation angle.

(5) Subsequently, the above—described test was repeated with a pulse light beam used instead of a continuous light beam. The pulse width is 10 psec (λ=0.9 μm). As shown in FIG. 5, a writing time of 100 psec or less was attained. The writing time of the medium is 1/10 or less that of a magneto-optical recording medium employing a Curie point data writing system.

Figure 9:
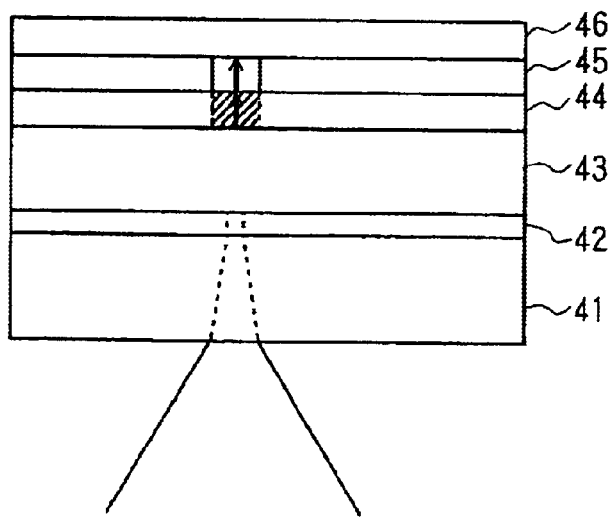
FIG. 9 shows a cross-sectional view of the magneto-optical recording medium of Example 1-b of the present invention.

FIG. 9 shows a cross-sectional view of the magneto-optical recording medium of Example 1-b of the present invention.

In the medium of Example 1-b, a two-layer (InMnAs layer/AlGaSb layer) structure film serves as a recording layer. The medium includes a GaAs <100> substrate 41 (thickness: 200–400 μm), an InAs buffer layer 42 (thickness: 10 nm), a recording layer 44 containing an AlGaSb layer 43 (thickness: 0.5 μm) and an InMnAs layer (thickness: 0.1 μm), a Tb—Fe—Co memory layer 45 (thickness: 30 nm), and an $Si_3N_4$ protective layer 46 (thickness: 30 nm). In Example 1-b, a light beam (wavelength: 0.9 μm) is used for writing operation.

In a manner similar to that of Example 1-a, the AlGaSb layer 43 (thickness: 0.5 μm) and the InMnAs layer 44 (thickness: 0.1 μm) are formed by use of an MBE apparatus. During formation of the AlGaSb layer 43, the temperature of the substrate is maintained at 520° C. During formation of the layers 43 and 44, each layer was analyzed by means of reflection electron diffraction. The results show that each layer was a good monocrystalline epitaxy film. Subsequently, the Tb—Fe—Co memory layer 45 (thickness: 30 nm) and the $Si_3N_4$ protective layer 46 (thickness: 30 nm) are formed on the layer 43 in a sputtering apparatus, to thereby complete production of the recording medium.

Thereafter, the resultant magneto-optical recording medium was tested in a manner similar to that of Example 1-a. The results show that, when a laser power (P) was 0.5 mW, θ became about 0.4°, demonstrating that magneto-optical recording was effected. The reason why that magneto-optical recording could be effected at the power (P) of 0.5 mW is thought to be enhancement of hole accumulation efficiency in the InMnAs layer 44 due to introduction of the AlGaSb layer 43. The writing time of the medium was 100 psec. or less.

The magneto-optical recording medium of Example 1-c of the present invention will next be described.

In Example 1-c, the medium includes a monocrystalline Group III–V diluted magnetic semiconductor thin film GaMnAs layer serving as a recording layer.

Through metal-organic vapor phase epitaxy (MOVPE), a GaMnAs (Mn compositional proportion: x=0.03) thin film was formed on a GaAs substrate at a substrate temperature of 350° C. Subsequently, a memory layer and a protective layer were formed in a manner similar to that of Example 1-a, to thereby produce a magneto-optical recording medium. The resultant medium was subjected to a magneto-optical recording test in a manner similar to that of Example 1-a. The results show that writing of data could be carried out by use of a laser beam having a wavelength of 0.9 μm and a power (P) of 10 mW.

Conceivably, the reason why the power of the laser beam had to be increased in order to effect writing operation is that the critical carrier density for expression of carrier-induced magnetization increases, because of low Mn density.

Example 2-a of the present invention will next be described. In Example 2-a, a magneto-optical recording medium including a polycrystalline InMnAs recording layer will be described.

Production of the medium is carried out in a multi-chamber-type reactive sputtering apparatus. Firstly, in a recording layer formation chamber, an InAs polycrystalline buffer layer (thickness: 10 nm) is formed on a transparent glass substrate at a substrate temperature (Ts) of 300–400° C. Subsequently, the temperature (Ts) is lowered to 200° C., and an $In_{0.9}Mn_{0.1}As$ polycrystalline photoinduced magnetization recording layer (thickness: 100 nm) is formed. Polycrystalline InAs and Mn are employed as sputtering targets. A gas mixture containing Ar and 10% $AsH_3$ is employed as a reactive gas. After formation of the recording layer is completed, the substrate is conveyed into a memory layer formation chamber. In the chamber, an amorphous Tb—Fe—Co film (thickness: 30 nm) is formed on the InMnAs layer, and then an $Si_3N_4$ protective layer (thickness: 30 nm) is formed on the Tb—Fe—Co film, to thereby complete production of the magneto-optical recording medium.

The resultant medium is removed from the sputtering apparatus, and subjected to magneto-optical recording by use of a magneto-optical recording apparatus including a light source for writing of data and a bias magnetization device. The magneto-optical recording is carried out under the following conditions:

(1) initialization magnetic field: −1,000 to −500 Oe;
(2) recording magnetic field: +100 to +400 Oe;
(3) light source: wavelength 0.9 μm, average power 0.1–10 mW, spot size 1.5 μm or thereabouts; and
(4) recording conditions: at a temperature within a range between the temperature of liquid nitrogen and room temperature, in a nitrogen atmosphere and in air.

After the magneto-optical recording was carried out under the above conditions, recording spots in the medium were observed under a polarizing microscope. The observation results show that clear recording spots can be obtained upon irradiation with light having an average power of about 1 mW. Subsequently, the magneto-optical recording medium was again placed in the magneto-optical recording apparatus, and an initialization magnetic field was applied to the medium. Thereafter, the medium was subjected to observation under the polarizing microscope. The results show that the recording spots in the medium were erased.

Example 2-b of the present invention will next be described.

In Example 2-b, a magneto-optical recording medium including a polycrystalline InMnAs/AlGaSb multi-layer structure recording layer will be described.

Production of the medium is carried out in a multi-chamber-type reactive sputtering apparatus. Firstly, in a buffer layer formation chamber, a CdSe polycrystalline buffer layer (thickness: 10 nm) is formed on a transparent glass substrate at a substrate temperature (Ts) of 200–300° C. Polycrystalline CdSe and Se are employed as sputtering targets.

Subsequently, in a recording layer formation chamber, an $Al_{0.3}Ga_{0.7}Sb$ layer (thickness: 100 nm) and an $In_{0.9}Mn_{0.1}As$ polycrystalline photoinduced magnetization recording layer (thickness: 100 nm) are formed at a Ts of 200° C. Polycrystalline InAs, polycrystalline GaSb, Al, Sb, and Mn are employed as sputtering targets. A gas mixture containing Ar and 10% $AsH_3$ is employed as a reactive gas. After formation of the recording layer is completed, the substrate is conveyed into a memory layer formation chamber. In the chamber, an amorphous Tb—Fe—Co film (thickness: 30 nm) is formed on the InMnAs layer, and then an $Si_3N_4$ protective layer (thickness: 30 nm) is formed on the Tb—Fe—Co film, to thereby complete production of the magneto-optical recording medium.

The resultant medium is removed from the sputtering apparatus, and subjected to magneto-optical recording by use of a magneto-optical recording apparatus including a light source for writing of data and a bias magnetization device. The magneto-optical recording is carried out under the following conditions:

(1) initialization magnetic field: −1,000 to −500 Oe;
(2) recording magnetic field: +100 to +400 Oe;
(3) light source: wavelength 0.68 μm, average power 0.1–10 mW, spot size 1 μm or thereabouts; and
(4) recording conditions: at a temperature within a range between the temperature of liquid nitrogen and room temperature, in a nitrogen atmosphere and in air.

After the magneto-optical recording was carried out under the above conditions, recording spots in the medium were observed under a polarizing microscope. The observation results show that clear recording spots can be obtained upon irradiation with light having an average power of about 1 mW. Subsequently, the magneto-optical recording medium was again placed in the magneto-optical recording apparatus, and an initialization magnetic field was applied to the medium. Thereafter, the medium was subjected to observation under the polarizing microscope. The results show that the recording spots in the medium were erased. In addition, the medium was tested in terms of magnetic recording transient response characteristics, by use of a linearly polarized probe light beam. The results show that magneto-optical recording was completed within a period of time of 1–10 nsec.

Example 3 of the present invention will next be described.

In Example 3, a magneto-optical recording medium including an organometallic complex thin film recording layer will be described.

$K_{0.2}C_{1.4}$-[Fe(CN)$_6$].6.9H$_2$O microcrystal powder is mixed with a cyanoethyl pullulan resin solution, and the resultant mixture is applied uniformly onto a transparent polycarbonate substrate so as to attain a thickness of 1 mm. Subsequently, the mixture was cured and dried at a temperature (Ts) of 100° C., to thereby form a recording layer. Thereafter, the resultant product is conveyed into a sputtering apparatus. In the apparatus, a memory layer (thickness: 30 nm) and an $Si_3N_4$ protective layer are formed on the recording layer, to thereby complete production of the magneto-optical recording medium.

The resultant medium is removed from the sputtering apparatus, and subjected to magneto-optical recording by use of a magneto-optical recording apparatus including a light source for writing of data and a bias magnetization device. The magneto-optical recording is carried out under the following conditions:

(1) initialization magnetic field: −2,000 Oe;
(2) recording magnetic field: +1,500 Oe;
(3) light source: wavelength 0.66 μm, average power 3.5 mW/cm$^2$, spot size 5 μm or thereabouts; and
(4) recording conditions: in a cryostat at a low temperature of 10 K (Kelvin).

After the magneto-optical recording was carried out under the above conditions, recording spots in the medium were observed under a polarizing microscope. The observation results show that clear recording spots were obtained. Subsequently, the magneto-optical recording medium was again placed in the magneto-optical recording apparatus, and an initialization magnetic field was applied to the medium. Thereafter, the medium was subjected to observation under the polarizing microscope. The results show that the recording spots in the medium were erased.

The present invention is not limited to the above-described embodiment. Numerous modifications and variations of the present invention are possible in light of the spirit of the present invention, and they are not excluded from the scope of the present invention.

INDUSTRIAL APPLICABILITY

As have been described in detail, the present invention achieves the following effects.

(A) The amount of time and light (electric) energy required for writing and reading of data can be greatly reduced while high-density recording is maintained. In addition, the energy consumption and size of the magneto-optical recording device can be reduced.

(B) Easing of data can be carried out through an operation of reversing the magnetization direction of the memory layer to the initial direction; i.e., an operation of reversing the direction of current applied to the bias magnetization device (electromagnet) to thereby apply a counter magnetic field to the magneto-optical recording medium. Therefore, an initialization magnetization device or an initialization magnetization layer is not necessary. Irradiation with light for initialization is not necessary.

(C) There can be provided a stationary-type or transportable—type magneto-optical recording device which requires a low-output light source and which does not require a dedicated device for initializing the memory layer or a recording medium having a special layer for initializing a memory layer.

What is claimed is:

1. A magneto-optical recording medium comprising:
   (a) a recording layer formed of a photoinduced-magnetic material thin film; and
   (b) a memory layer formed of a ferromagnetic thin film having perpendicular magnetic anisotropy, wherein
   (c) the recording layer is subjected to photoinduced magnetization in which magnetism is produced directly through irradiation with light under application of a bias magnetic field.

2. A magneto-optical recording medium according to claim 1, wherein the photoinduced-magnetic material thin film is a magnetic semiconductor thin film.

3. A magneto-optical recording medium according to claim 1, wherein the photoinduced-magnetic material thin film is a diluted magnetic semiconductor thin film.

4. A magneto-optical recording medium according to claim 1, wherein the photoinduced-magnetic material thin film is a Group III–V diluted magnetic semiconductor thin film.

5. A magneto-optical recording medium according to claim 1, wherein the photoinduced-magnetic material thin film is an organometallic complex thin film.

6. A magneto-optical recording medium according to claim 1, wherein the photoinduced-magnetic material thin film is a multi-layer structure film containing at least one magnetic semiconductor thin film.

7. A magneto-optical recording medium according to claim 1, wherein the photoinduced-magnetic material thin film is a multi-layer structure film containing at least one diluted magnetic semiconductor thin film.

8. A magneto-optical recording medium according to claim 1, wherein the photoinduced-magnetic material thin film is a multi-layer structure film containing at least one Group III–V diluted magnetic semiconductor thin film.

9. A magneto-optical recording medium according to claim 1, wherein the photoinduced-magnetic material thin film is a multi-layer structure film containing at least one organometallic complex thin film.

10. A magneto-optical recording medium according to claim 1, wherein the memory layer is a thin film of an alloy or compound containing a transition metal.

11. A magneto-optical recording medium according to claim 1, wherein the memory layer is a thin film of an alloy or compound containing a rare earth metal.

12. A magneto-optical recording medium according to claim 1, wherein the memory layer is formed from an Fe—Co-based magnetic thin film material.

13. A magneto-optical recording medium according to claim 1, wherein the memory layer is formed from a Tb—Fe—Co-based magnetic thin film material.

14. A magneto-optical recording device comprising a magneto-optical recording medium which is fixed mounted, which medium comprises a recording layer formed of a photoinduced-magnetic material thin film and a memory layer formed of a ferromagnetic thin film having perpendicular magnetic anisotropy, wherein the recording layer is subjected to photoinduced magnetization in which magnetism is produced directly through irradiation with light.

15. A magneto-optical recording device according to claim 14, wherein the light irradiation is carried out by means of a low-output semiconductor laser.

16. A magneto-optical recording device according to claim 15, which further comprises a bias magnetization device.

17. A magneto-optical recording device comprising a magneto-optical recording medium which assumes a transportable form, which medium comprises a recording layer formed of a photoinduced-magnetic material thin film and a memory layer formed of a ferromagnetic thin film having perpendicular magnetic anisotropy.

18. A magneto-optical recording device according to claim 17, wherein the light irradiation is carried out by means of a low-output semiconductor laser.

19. A magneto-optical recording device according to claim 18, which further comprises a bias magnetization device.

* * * * *